(12) United States Patent
Okada et al.

(10) Patent No.: US 6,463,134 B1
(45) Date of Patent: Oct. 8, 2002

(54) EASY RESPONSE SYSTEM

(75) Inventors: Noritake Okada, Kanagawa (JP); Masahide Morozumi, Kanagawa (JP); Mitsuji Toda, Kanagawa (JP); Naoya Morita, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 58 days.

(21) Appl. No.: 09/631,228

(22) Filed: Aug. 2, 2000

(30) Foreign Application Priority Data

Aug. 3, 1999 (JP) ............................................ 11-219540

(51) Int. Cl.7 .......................................... H04M 11/00
(52) U.S. Cl. .................. 379/93.24; 379/88.14; 379/88.17; 379/93.01; 370/352; 455/412
(58) Field of Search ........................... 379/93.24, 93.01, 379/88.14, 88.15, 88.16, 88.17, 88.18, 88.22, 88.11; 370/352, 401, 338; 455/412, 413, 426, 466; 709/207 A

(56) References Cited

U.S. PATENT DOCUMENTS 5,333,266 A * 7/1994 Boaz et al. ............... 379/93.24
5,717,742 A * 2/1998 Hyde-Thomson ........ 379/93.24
6,289,212 B1 * 9/2001 Stein et al. ................. 455/412

FOREIGN PATENT DOCUMENTS

| EP | 0777394 A1 | * 6/1997 | ............ H04Q/7/22 |
| EP | 0 825 790 | 2/1998 | |
| EP | 98/58476 | 12/1998 | |

* cited by examiner

Primary Examiner—Melur Ramakrishnaiah
(74) Attorney, Agent, or Firm—Pearne & Gordon LLP

(57) ABSTRACT

An easy response system for enabling a reply of yes or no to be made with the touch of a key or a voice reply to be made to electronic mail received at a portable telephone. A gateway unit 20 having an interface to Internet 1000 and an interface to a portable telephone network 2000 contains Internet communication means for transmitting and receiving electronic mail to and from a personal computer 10, portable telephone filter means for converting electronic mail received from the personal computer into a format in which the electronic mail can be handled on a portable telephone 30, reply mail preparation means for preparing reply mail to the personal computer 10, and portable telephone data communication means for receiving key input on the portable telephone. The portable telephone contains gateway communication means for sending key input to the gateway unit, electronic mail display means, and key input means, and operation description means for converting the key input into the corresponding operation. A reply can be easily made to electronic mail through key input or a voice reply can be easily made to electronic mail.

7 Claims, 13 Drawing Sheets

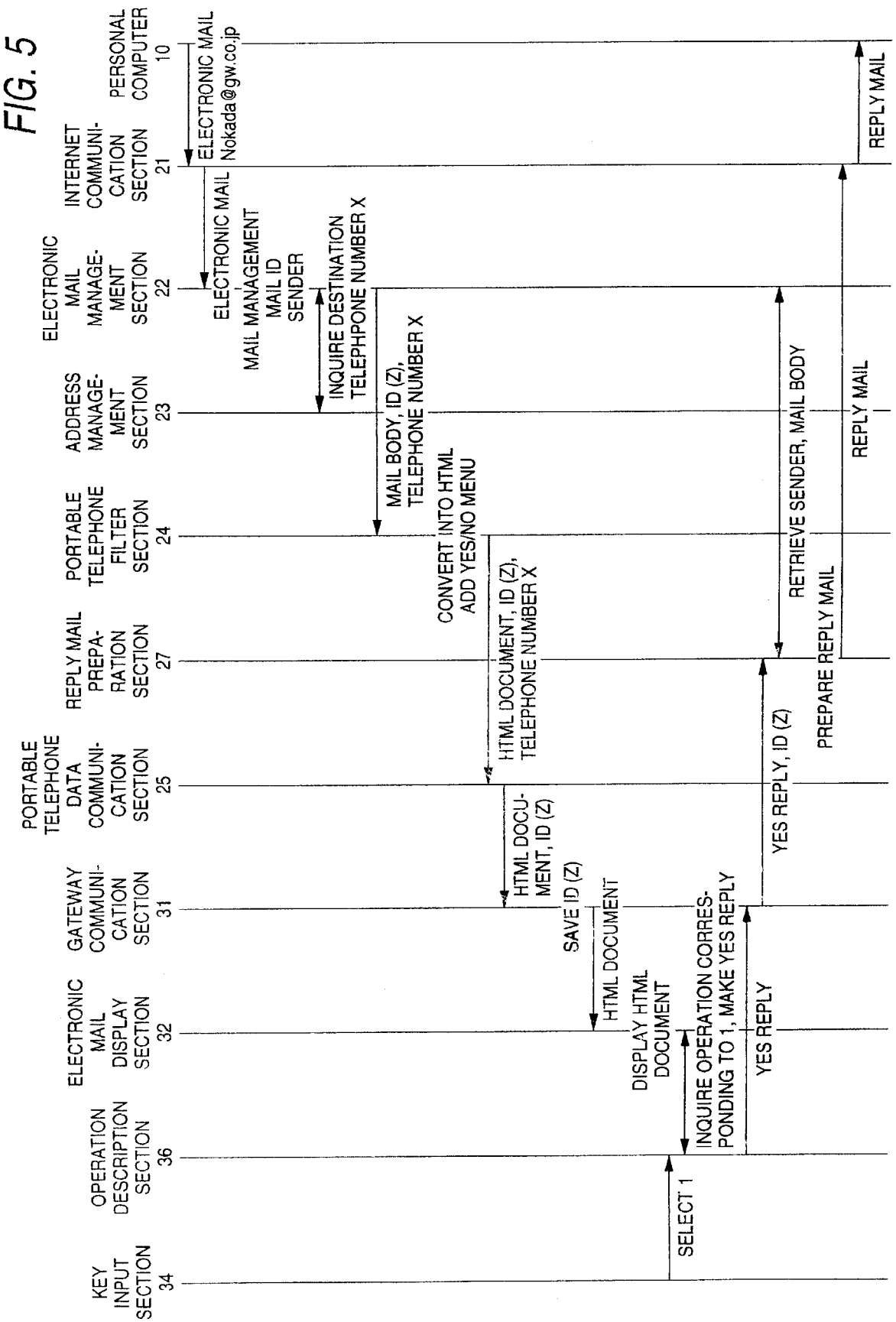

FIG. 6

MR. NOKADA
WE WILL HOLD SECOND DEVELOPMENT CONFERENCE
PRELIMINARY MEETING AS IN THE FOLLOWING.
YOUR REPLY IS REQUESTED AS TO WHETHER OR NOT
YOU WILL ATTEND THE MEETING.

DATE: 10A.M. ON MARCH 30
PLACE: LARGE CONFERENCE ROOM

FIG. 7

```
< html >
MR. NOKADA
WE WILL HOLD SECOND DEVELOPMENT CONFERENCE
PRELIMINARY MEETING AS IN THE FOLLOWING.
YOUR REPLY IS REQUESTED AS TO WHETHER OR NOT
YOU WILL ATTEND THE MEETING.
< BR >
< a ref = "Yes"    accesskey = "1" >  1. I WILL ATTEND.  < /a >
< BR >
< a ref = "NO"    accesskey = "2" >  2. I CANNOT ATTEND.  < /a >
< /html >
```

MR. YOKADA
THIS IS NOKADA.
I WILL ATTEND.
> WE WILL HOLD SECOND DEVELOPMENT CONFERENCE PRELIMINARY MEETING AS IN THE FOLLOWING.
> YOUR REPLY IS REQUESTED AS TO WHETHER OR NOT YOU WILL ATTEND THE MEETING.

> DATE: 10A.M. ON MARCH 30
> PLACE: LARGE CONFERENCE ROOM

FIG. 10

MR. NOKADA
WE WILL HOLD SECOND DEVELOPMENT CONFERENCE PRELIMINARY MEETING AS IN THE FOLLOWING.
YOUR REPLY IS REQUESTED AS TO WHETHER OR NOT YOU WILL ATTEND THE MEETING.

I WILL ATTEND.        I CANNOT ATTEND.

FUNCTION    RESEND    OFF 1  2  3
4  5  6
7  8  9
*  0  #

MR. NOKADA
WE SOLICIT IDEAS ON THE NEXT COMMODITY.
YOUR IDEAS ARE REQUESTED UNTIL THE WEEKEND.

//VOICE

< html >
MR. NOKADA
WE SOLICIT IDEAS ON THE NEXT COMMODITY.
YOUR IDEAS ARE REQUESTED UNTIL THE WEEKEND.
< BR >
< a ref = "VOICE"    accesskey = "1" > 1. VOICE REPLY < /a >
< /html >

FIG. 15

MR. YOKADA

THIS IS NOKADA.
I ATTACH A VOICE FILE OF A COMMUNICATION MESSAGE.

WE SOLICIT IDEAS ON THE NEXT COMMODITY.
YOUR IDEAS ARE REQUESTED UNTIL THE WEEKEND.

FIG. 16

MR. NOKADA
WE SOLICIT IDEAS ON THE NEXT COMMODITY.
YOUR IDEAS ARE REQUESTED UNTIL THE WEEKEND.

VOICE REPLY

| FUNCTION | RESEND | OFF |
|---|---|---|
| 1 | 2 | 3 |
| 4 | 5 | 6 |
| 7 | 8 | 9 |
| * | 0 | # |

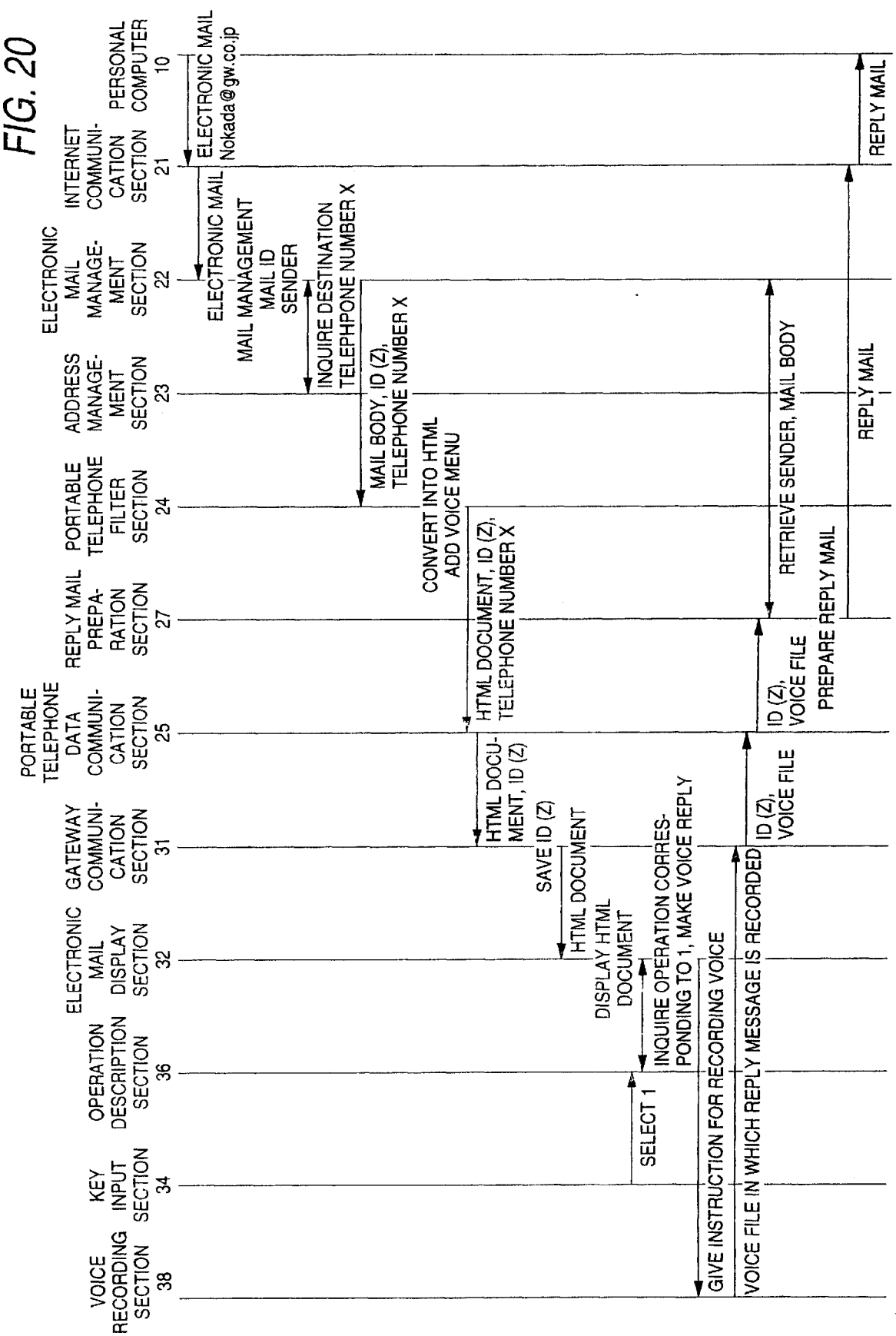

EASY RESPONSE SYSTEM

BACKGROUND OF THE INVENTION

This invention relates to an easy response system in a network configuration in which the Internet and a portable telephone network are interconnected and in particular to an easy response system which enables a portable telephone to easily make a voice response or perform reply operation through key input to electronic mail sent from a personal computer on an internetwork to the portable telephone.

In recent years, with support of a data communication function in a portable telephone network, the portable telephone itself has been advanced and portable telephones capable of transmitting and receiving electronic mail have appeared.

However, hitherto, such portable telephones, unlike personal computers, have involved limited input ways and thus have been mainly used for receiving electronic mail.

The portable telephones are mainly used only for reception and a reply function important as communication means, the essential purpose of electronic mail, is scarcely used.

SUMMARY OF THE INVENTION

It is therefore an object of the invention to provide an easy response system for enabling a reply of yes or no to be made with the touch of a key or a voice reply to be made to electronic mail received at a portable telephone.

According to the first aspect of the invention, there is provided an easy message response system comprising a gateway unit having a connection interface to the Internet and an interface to a portable telephone network for sending electronic mail from the Internet to a portable telephone in the portable telephone network and returning a reply from the portable telephone to a party transmitting the electronic mail, wherein the gateway unit comprises Internet communication means for transmitting and receiving electronic mail to and from a personal computer in the Internet, portable telephone filter means for converting the electronic mail addressed to the portable telephone, received from the Internet communication means into a format for enabling the electronic mail to be displayed on the portable telephone and reply operation to the electronic mail to be performed on the portable telephone, reply mail preparation means for preparing reply mail to the personal computer in the Internet in response to a reply made through key input on the portable telephone, and portable telephone data communication means for transmitting the output result of the portable telephone filter means to the portable telephone and receiving an operation instruction given through key input on the portable telephone, and wherein the portable telephone comprises gateway communication means for receiving the output data from the portable telephone filter means in the gateway unit and informing the gateway unit of the operation corresponding to the key input on the portable telephone, portable telephone mail display means for displaying the output data received from the portable telephone filter means on a screen of the portable telephone, key input means for accepting the key input on the portable telephone, and operation description means for converting the key input through the key input means into the operation corresponding to information displayed by the portable telephone mail display means.

In the invention, the Internet communication means transmits and receives electronic mail to and from a personal computer on the Internet, the portable telephone filter means converts the electronic mail addressed to the portable telephone into a format for enabling the electronic mail to be displayed on the portable telephone, such as Internet standard HTML format or WML format defined in WAP for the portable telephone having a browsing function, and reply operation to the electronic mail to be performed on the portable telephone, the reply mail preparation means prepares a simple reply document indicating yes, no, etc., to the personal computer in the Internet in response to pressing a keypad on the portable telephone, the portable telephone data communication means transmits data converted into the format in which display and reply operation can be performed on the portable telephone and receives an operation instruction for preparing a document containing yes or no in response to pressing the keypad on the portable telephone as a reply to the received mail, the gateway communication means receives the data converted into the format in which display and reply operation can be performed on the portable telephone from the gateway unit and transmits an operation instruction for preparing a document containing yes or no in response to pressing the keypad on the portable telephone as a reply to the received mail, the portable telephone mail display means displays the received data converted into the format in which display and reply operation can be performed on the portable telephone on the screen thereof, the key input means accepts pressing the keypad on the portable telephone, and the operation description means converts the information provided by pressing the keypad into the corresponding operation, for example, converts the information into preparation of a reply document indicating yes to the received mail.

According to the second aspect of the invention, there is provided an easy message response system comprising a gateway unit having a connection interface to the Internet and an interface to a portable telephone network for sending electronic mail from the Internet to a portable telephone in the portable telephone network and returning a reply from the portable telephone to a party transmitting the electronic mail, wherein the gateway unit comprises Internet communication means for transmitting and receiving electronic mail to and from a personal computer in the Internet, portable telephone filter means for adding a reply menu for enabling an easy reply of yes or no to be made on the portable telephone to the electronic mail addressed to the portable telephone, received from the Internet communication means, reply mail preparation means for preparing reply mail to the personal computer in the Internet in response to a reply menu selection result from the portable telephone, and portable telephone data communication means for transmitting the electronic mail to which the reply menu is added to the portable telephone and receiving reply menu selection result from the portable telephone, and wherein the portable telephone comprises gateway communication means for receiving the output data containing the reply menu from the portable telephone filter means in the gateway unit and informing the gateway unit of the operation corresponding to the reply selection menu, portable telephone mail display means for displaying the output data received from the portable telephone filter means on a screen of the portable telephone, key input means for accepting the key input on the portable telephone, and operation description means for converting the key input through the key input means into operation description corresponding to information displayed by the portable telephone mail display means.

In the invention, the Internet communication means transmits and receives electronic mail to and from a personal computer on the Internet, the portable telephone filter means converts the electronic mail addressed to the portable telephone into a format for enabling the electronic mail to be displayed on the portable telephone, such as Internet standard HTML format or WML format defined in WAP for the portable telephone having a browsing function and adds a reply menu for enabling an easy reply of yes or no to be made on the portable telephone to the electronic mail received at the portable telephone, the reply mail preparation means prepares a simple reply document indicating yes, no, etc., to the personal computer in the Internet in response to reply menu selection made on the portable telephone, the portable telephone data communication means transmits data converted into the format in which display and reply operation can be performed on the portable telephone to which a reply menu is added and receives an operation instruction for preparing a document containing yes or no in response to pressing the keypad on the portable telephone as a reply to the received mail, the gateway communication means receives the data converted into the format in which display and reply operation can be performed on the portable telephone to which the reply menu is added from the gateway unit and transmits an operation instruction for preparing a document containing yes or no in response to pressing the keypad on the portable telephone as a reply to the received mail, the portable telephone mail display means displays the received data converted into the format in which display and reply operation can be performed on the portable telephone to which the reply menu is added on the screen of the portable telephone, the key input means accepts pressing the keypad on the portable telephone, and the operation description means converts the information provided by pressing the keypad into the operation described on reply selection menu, for example, converts the information into preparation of a reply document indicating yes to the received mail.

According to the third aspect of the invention, there is provided an easy message response system comprising a gateway unit having a connection interface to the Internet and an interface to a portable telephone network for sending electronic mail from the Internet to a portable telephone in the portable telephone network and returning a reply from the portable telephone to a party transmitting the electronic mail, wherein the gateway unit comprises Internet communication means for transmitting and receiving electronic mail to and from a personal computer in the Internet, portable telephone filter means for converting the electronic mail addressed to the portable telephone, received from the Internet communication means into a data format in which a yes/no screen for enabling an easy reply to be made on the portable telephone to the electronic mail can be displayed together with corresponding function keys, reply mail preparation means for preparing reply mail to the personal computer in the Internet in response to a function key selection result from the portable telephone, and portable telephone data communication means for transmitting the electronic mail with the yes/no screen displayed at the position of the function keys and receiving function key selection result from the portable telephone, and wherein the portable telephone comprises gateway communication means for receiving the output data containing the yes/no screen display at the position of the function keys from the portable telephone filter means in the gateway unit and informing the gateway unit of the operation corresponding to the function key selection result, portable telephone mail display means for displaying the output data received from the portable telephone filter means on a screen of the portable telephone, key input means for accepting the key input on the portable telephone, and operation description means for converting the key input through the key input means into operation description corresponding to information displayed by the portable telephone mail display means.

In the invention, the Internet communication means transmits and receives electronic mail to and from a personal computer on the Internet, the portable telephone filter means converts the electronic mail addressed to the portable telephone into a format for enabling the electronic mail to be displayed on the portable telephone, such as Internet standard HTML format or WML format defined in WAP for the portable telephone having abrowsing function, and makes a description for making it possible to display a screen for enabling an easy reply of yes or no to be made to the electronic mail received on the portable telephone together with function keys, the reply mail preparation means prepares a simple reply document indicating yes, no, etc., to the personal computer in the Internet in response to function key selection corresponding to the yes/no screen from the portable telephone, the portable telephone data communication means transmits data converted into the format in which display and reply operation can be performed on the portable telephone for displaying the yes/no screen at the function key position and receives an operation instruction for preparing a document containing yes or no in response to pressing the keypad on the portable telephone as a reply to the received mail, the gateway communication means receives the data converted into the format in which display and reply operation can be performed on the portable telephone for displaying the yes/no screen at the function key position from the gateway unit and transmits an operation instruction for preparing a document containing yes or no in response to the function key selection result corresponding to the yes/no screen by pressing the keypad on the portable telephone as a reply to the received mail, the portable telephone mail display means displays the received data converted into the format in which display and reply operation can be performed on the portable telephone for displaying the yes/no screen at the function key position on the screen of the portable screen, the key input means accepts pressing the keypad on the portable telephone, and the operation description means converts the key input into the operation displayed on the screen corresponding to the pressed function key, such as preparation of a reply document indicating yes to the received mail.

According to the fourth aspect of the invention, there is provided an easy message response system comprising a gateway unit having a connection interface to the Internet, an interface to a portable telephone network, and an interface to a voice mail server for transmitting electronic mail from the Internet to a portable telephone in the portable telephone network and recording a reply message in the voice mail server from the portable telephone, wherein the gateway unit receives a voice file containing the recorded reply message from the voice mail server and returns reply mail to which the voice file is attached to a party transmitting the electronic mail, wherein the gateway unit comprises Internet communication means for transmitting and receiving electronic mail to and from a personal computer in the Internet, portable telephone filter means for converting the electronic mail addressed to the portable telephone, received from the Internet communication means into a format for enabling the electronic mail to be displayed on the portable telephone and voice reply operation to b e performed on the portable telephone for the voice mail server, voice mail server communication means for receiving the voice file containing the recorded response message from the portable telephone and corresponding electronic mail information, reply mail preparation means for preparing reply mail to which the voice file is attached to the personal computer in the Internet based on the voice file and the corresponding electronic mail information received from the voice mail server communication means, and portable telephone data communication means for transmitting the output result of the portable telephone filter means to the portable telephone, wherein the portable telephone comprises gateway communication means for receiving the output data from the portable telephone filter means in the gateway unit, portable telephone mail display means for displaying the output data received from the portable telephone filter means on a screen of the portable telephone, key input means for accepting the key input on the portable telephone, and voice mail communication means for adding the corresponding electronic mail information, originating a call, and transmitting reply message as voice to the voice mail server if the key input on the key input means is a voice mail response, and wherein the voice mail server comprises portable telephone communication means for accepting the call originated from the portable telephone, transmitting a voice guidance for prompting a user of the portable telephone to record a voice reply message, and temporarily storing a voice reply message from the portable telephone as a voice file with the corresponding electronic mail information added at the call originating time as an index, and gateway communication means for transmitting the voice file to the gateway unit together with the corresponding electronic mail information.

In the invention, the Internet communication means transmits and receives electronic mail to and from a personal computer on the Internet, the portable telephone filter means converts the electronic mail addressed to the portable telephone into a format for enabling the electronic mail to be displayed on the portable telephone, such as Internet standard HTML format or WML format defined in WAP for the portable telephone having a browsing function, and voice reply operation to be performed on the portable telephone for the voice mail server, the voice mail server communication means receives the voice file containing the recorded response message from the portable telephone and the corresponding electronic mail information, the reply mail preparation means retrieves the reply destination from the corresponding electronic mail information and prepares reply mail to which the voice file from the voice mail server is added, the portable telephone data communication means transmits data converted into the format in which display can be produced on the portable telephone and voice reply operation can be performed for the voice mail server, the gateway communication means receives the data converted into the format in which display can be produced on the portable telephone and voice reply operation can be performed for the voice mail server from the gateway unit, the portable telephone mail display means displays the received data converted into the format in which display can be produced on the portable telephone and voice reply operation can be performed for the voice mail server on the screen of the portable telephone, the key input means accepts pressing the keypad on the portable telephone, the voice mail communication means adds the corresponding received electronic mail information, originates a call, and transmits reply message as voice to the voice mail server if a voice mail response is selected as a result of pressing the keypad, the portable telephone communication means accepts the call originated from the portable telephone, transmits a voice guidance for prompting a user of the portable telephone to record a voice reply message, and temporarily stores a voice file with the corresponding electronic mail information added at the call originating time as an index, and the gateway communication means for transmits the voice file to the gateway unit together with the corresponding electronic mail information.

According to the fifth aspect of the invention, there is provided an easy message response system comprising a gateway unit having a connection interface to the Internet and an interface to a portable telephone network for transmitting electronic mail from the Internet to a portable telephone in the portable telephone network and returning a voice reply message recorded on the portable telephone as an attached file to a party transmitting the electronic mail, wherein the gateway unit comprises Internet communication means for transmitting and receiving electronic mail to and from a personal computer in the Internet, portable telephone filter means for converting the electronic mail addressed to the portable telephone, received from the Internet communication means into a format for enabling the electronic mail to be displayed on the portable telephone and voice reply operation to the electronic mail to be performed on the portable telephone, reply mail preparation means for preparing reply mail to which the voice file containing the recorded reply message received from the portable telephone is attached, and portable telephone data communication means for transmitting the output result of the portable telephone filter means to the portable telephone, and wherein the portable telephone comprises gateway communication means for receiving the output data from the portable telephone filter means in the gateway unit and transmitting the voice file containing the recorded reply message to the gateway unit, portable telephone mail display means for displaying the output data received from the portable telephone filter means on a screen of the portable telephone, key input means for accepting the key input on the portable telephone, and voice recording means for inputting and recording a reply message as voice if the key input on the key input means is a voice mail response.

In the invention, the Internet communication means transmits and receives electronic mail to and from a personal computer on the Internet, the portable telephone filter means converts the electronic mail addressed to the portable telephone into a format for enabling the electronic mail to be displayed on the portable telephone, such as Internet standard HTML format or WML format defined in WAP for the portable telephone having a browsing function, and voice reply operation to be performed on the portable telephone, the reply mail preparation means prepares reply mail to which the voice file containing the recorded reply message received from the portable telephone is attached, the portable telephone data communication means transmits data converted into the format in which display and voice reply operation can be performed on the portable telephone, the gateway communication means receives the data converted into the format in which display and voice reply operation can be performed on the portable telephone from the gateway unit and transmits the voice file containing the recorded reply message to the gateway unit, the portable telephone mail display means displays the received data converted into the format in which display and voice reply operation can be performed on the portable telephone on the screen thereof, the key input means accepts pressing the keypad on the portable telephone, and the voice recording means inputs and records a reply message as voice if a voice mail response is selected as a result of pressing the keypad.

According to the sixth aspect of the invention, there is provided an easy message response system comprising a gateway unit having a connection interface to the Internet, an interface to a portable telephone network, and an interface to a voice mail server for transmitting electronic mail from the Internet to a portable telephone in the portable telephone network and recording a reply message in the voice mail server from the portable telephone, wherein the gateway unit receives a voice file containing the recorded reply message from the voice mail server and returns the voice file as an attached file to a party transmitting the electronic mail or preparing a reply message in response to the operation from the portable telephone and returning the reply message to the party transmitting the electronic mail, wherein the gateway unit comprises Internet communication means for transmitting and receiving electronic mail to and from a personal computer in the Internet, portable telephone filter means for converting the electronic mail addressed to the portable telephone, received from the Internet communication means into a format for enabling the electronic mail to be displayed on the portable telephone and reply operation to be performed on the portable telephone or a format for enabling voice reply operation to be performed on the portable telephone for the voice mail server, voice mail server communication means for receiving the voice file containing the recorded response message from the portable telephone and corresponding electronic mail information, reply mail preparation means for preparing reply mail to which the voice file is attached to the personal computer in the Internet based on the voice file and the corresponding electronic mail information received from the voice mail server communication means or preparing reply mail to the personal computer in the Internet in response to a reply made through key input on the portable telephone, and portable telephone data communication means for transmitting the output result of the portable telephone filter means to the portable telephone, wherein the portable telephone comprises gateway communication means for receiving the output data from the portable telephone filter means in the gateway unit and informing the gateway unit of the operation corresponding to the key input on the portable telephone, portable telephone mail display means for displaying the output data received from the portable telephone filter means on a screen of the portable telephone, key input means for accepting the key input on the portable telephone, operation description means for converting the key input through the key input means into the operation corresponding to information displayed by the portable telephone mail display means, and voice mail communication means for adding the corresponding electronic mail information, originating a call, and transmitting reply message as voice to the voice mail server if the operation description means indicates a voicemail response, and wherein the voice mail server comprises portable telephone communication means for accepting the call originated from the portable telephone, transmitting a voice guidance for prompting a user of the portable telephone to record a voice reply message, and temporarily storing a voice reply message from the portable telephone as a voice file with the corresponding electronic mail information added at the call originating time as an index, and gateway communication means for transmitting the voice file to the gateway unit together with the corresponding electronic mail information.

In the invention, the Internet communication means transmits and receives electronic mail to and from a personal computer on the Internet, the portable telephone filter means converts the electronic mail addressed to the portable telephone into a format for enabling the electronic mail to be displayed on the portable telephone, such as Internet standard HTML format or WML format defined in WAP for the portable telephone having a browsing function, and reply operation to be performed on the portable telephone or a format for enabling voice reply operation to be performed on the portable telephone for the voice mail server, the voice mail server communication means receives the voice file containing the recorded response message from the portable telephone and the corresponding electronic mail information, the reply mail preparation means prepares simple reply mail indicating yes, no, etc., to the personal computer in the Internet in response to pressing a keypad on the portable telephone or retrieves the reply destination from the corresponding electronic mail information and prepares reply mail to which the voice file from the voice mail server is added, the portable telephone data communication means transmits data converted into the format in which display and reply operation can be performed on the portable telephone or voice reply operation can be performed on the portable telephone for the voice mail server and receives an operation instruction for preparing a document containing yes or no in response to pressing the keypad on the portable telephone as a reply to the received mail, the gateway communication means receives the data converted into the format in which display and reply operation can be performed on the portable telephone or voice reply operation can be performed on the portable telephone for the voice mail server from the gateway unit and transmits the operation instruction for preparing a document containing yes or no in response to pressing the keypad on the portable telephone as a reply to the received mail, the portable telephone mail display means displays the received data converted into the format in which display and reply operation can be performed on the portable telephone and the received data converted into the format in which voice reply operation can be performed on the portable telephone for the voice mail server on the screen of the portable telephone, the key input means accepts pressing the keypad on the portable telephone, the operation description means converts the information provided by pressing the keypad into the corresponding operation, for example, preparation of a reply document indicating yes to the received mail, the voice mail communication means adds the corresponding received electronic mail information, originates a call, and transmits reply message as voice to the voice mail server if a voice mail response is selected as a result of pressing the keypad, the portable telephone communication means accepts the call originated from the portable telephone, transmits a voice guidance for prompting a user of the portable telephone to record a voice reply message, and temporarily stores a voice file with the corresponding electronic mail information added at the call originating time as an index, and the gateway communication means for transmits the voice file to the gateway unit together with the corresponding electronic mail information.

According to the seventh aspect of the invention, there is provided an easy message response system comprising a gateway unit having a connection interface to the Internet and an interface to a portable telephone network for transmitting electronic mail from the Internet to a portable telephone in the portable telephone network and returning a voice reply message recorded on the portable telephone as an attached file to a party transmitting the electronic mail or preparing a reply message in response to the operation from the portable telephone and returning the reply message to the party transmitting the electronic mail, wherein the gateway unit comprises Internet communication means for transmitting and receiving electronic mail to and from a personal computer in the Internet, portable telephone filter means for converting the electronic mail addressed to the portable telephone, received from the Internet communication means into a format for enabling the electronic mail to be displayed on the portable telephone and reply operation to be performed on the portable telephone or a format for enabling voice reply operation to be performed on the portable telephone, reply mail preparation means for preparing reply mail to which the voice file containing the recorded reply message received from the portable telephone is attached or preparing reply mail to the personal computer in the Internet in response to a reply made through key input on the portable telephone, and portable telephone data communication means for transmitting the output result of the portable telephone filter means to the portable telephone, and wherein the portable telephone comprises gateway communication means for receiving the output data from the portable telephone filter means in the gateway unit and transmitting the voice file containing the recorded reply message to the gateway unit or informing the gateway unit of the operation corresponding to the key input on the portable telephone, portable telephone mail display means for displaying the output data received from the portable telephone filter means on a screen of the portable telephone, key input means for accepting the key input on the portable telephone, operation description means for converting the key input through the key input means into the corresponding operation based on information displayed by the portable telephone mail display means, and voice recording means for inputting and recording reply message as voice if the operation description means indicates a voice mail response.

In the invention, the Internet communication means transmits and receives electronic mail to and from a personal computer on the Internet, the portable telephone filter means converts the electronic mail addressed to the portable telephone into a format for enabling the electronic mail to be displayed on the portable telephone, such as Internet standard HTML format or WML format defined in WAP for the portable telephone having a browsing function, and reply operation to be performed on the portable telephone or a format for enabling voice reply operation to be performed on the portable telephone, the reply mail preparation means prepares a simple reply document indicating yes, no, etc., to the personal computer in the Internet in response to pressing a keypad on the portable telephone or reply mail to which a voice file containing a recorded reply message received from the portable telephone is attached, the portable telephone data communication means transmits data converted into the format in which display and reply operation can be performed on the portable telephone or voice reply operation can be performed on the portable telephone and receives an operation instruction for preparing a document containing yes or no in response to pressing the keypad on the portable telephone as a reply to the received mail, the gateway communication means receives the data converted into the format in which display and reply operation can be performed on the portable telephone or voice reply operation can be performed on the portable telephone from the gateway unit and transmits the operation instruction for preparing a document containing yes or no in response to pressing the keypad on the portable telephone as a reply to the received mail and the voice file containing the recorded replay message, the portable telephone mail display means displays the received data converted into the format in which display and reply operation can be performed on the portable telephone and the received data converted into the format in which voice reply operation can be performed on the portable telephone on the screen of the portable telephone, the key input means accepts pressing the keypad on the portable telephone, the operation description means converts the information provided by pressing the keypad into the corresponding operation, for example, preparation of a reply document indicating yes to the received mail, and the voice recording means inputs and records a reply message as voice if a voice mail response is selected as a result of pressing the keypad.

BRIEF DESCRIPTION OF THE DRAWINGS

FIG. 5 is a schematic representation to describe an easy reply sequence flow for preparing reply mail of no by key input to electronic mail from a personal computer in the Internet to the portable telephone in the first embodiment of the invention;

FIG. 6 is a drawing to show a message example of electronic mail sent from the personal computer in the Internet to the portable telephone for requesting the user of the portable telephone to make a reply of yes/no in the first embodiment of the invention;

FIG. 7 is a drawing to show a message example as an HTML document into which the electronic mail shown in FIG. 6 to which a reply menu of yes/no is added is converted;

FIG. 10 is a drawing to show an example of using the browser to display a WML document into which the electronic mail shown in FIG. 6 is converted with added answer display indicating presence or absence on the portable telephone;

FIG. 15 is a drawing to show an example of automatically preparing reply mail to which a voice file containing a recorded reply message is attached in the gateway unit as instructed from the portable telephone to the electronic mail shown in FIG. 12;

FIG. 16 is a drawing to show an example of using the browser to display a WML document into which the electronic mail shown in FIG. 12 is converted on the portable telephone;

FIG. 20 is a schematic representation to describe an easy reply sequence flow for using a reply message recorded on the portable telephone to prepare voice reply mail to electronic mail from a personal computer in the Internet to the portable telephone in the second embodiment of the invention.

DETAILED DESCRIPTION OF THE PREFERRED EMBODIMENTS

Referring now to the accompanying drawings (FIGS. 1 to 20), there are shown first and second embodiments of the invention.

First Embodiment

Figure 1:
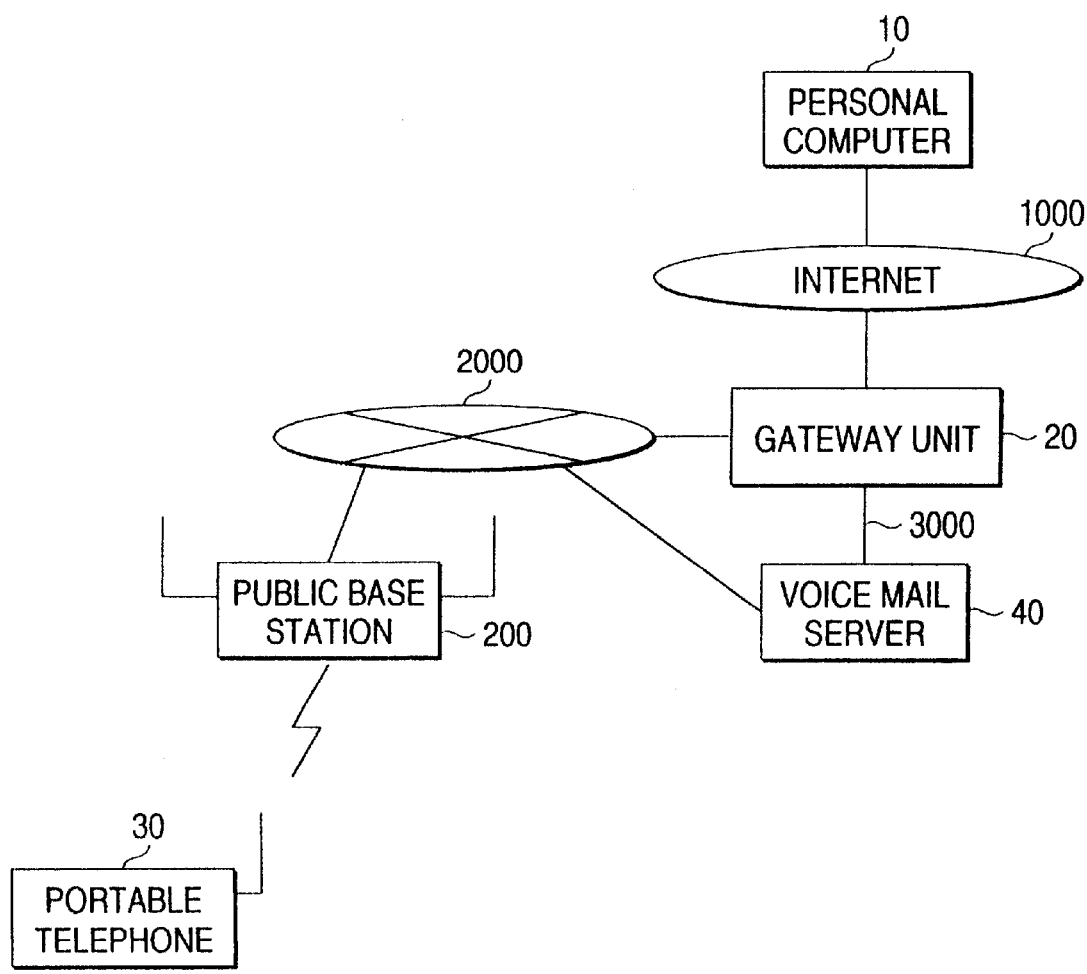
FIG. 1 is a block diagram to show the configuration of an easy response system comprising a gateway unit, a portable telephone, and a voice mail server in a first embodiment of the invention.
Figure 2:
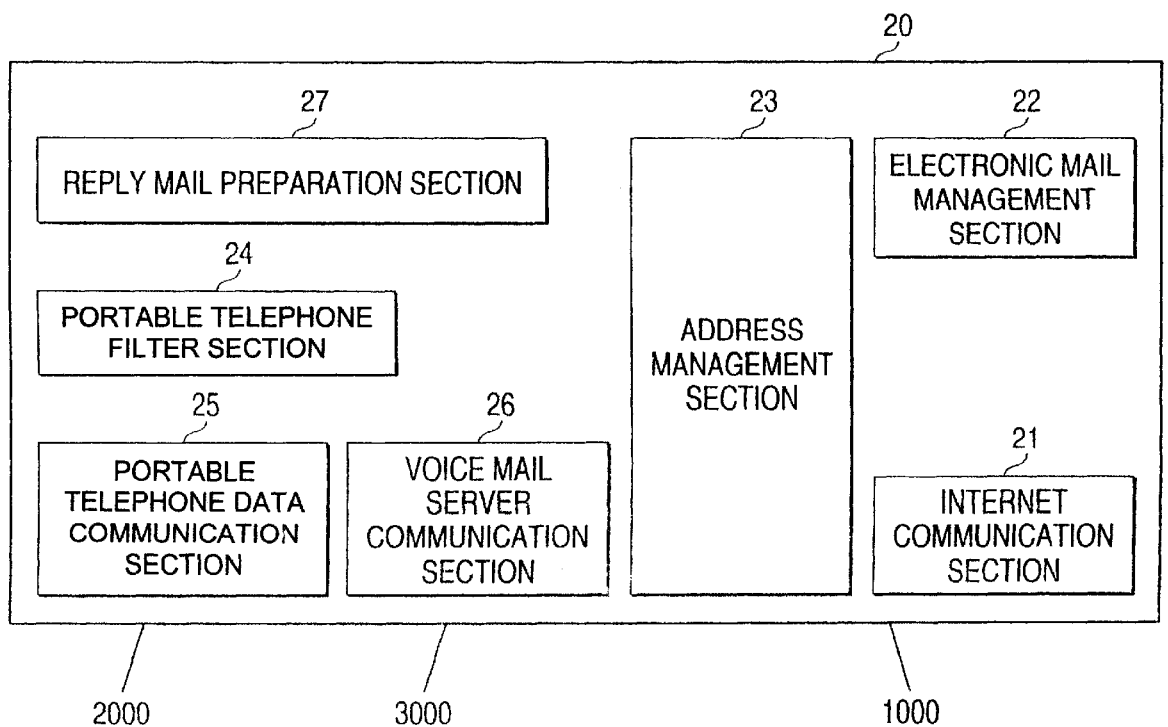
FIG. 2 is a block diagram to show the configuration of the gateway unit in FIG. 1.
Figure 3:
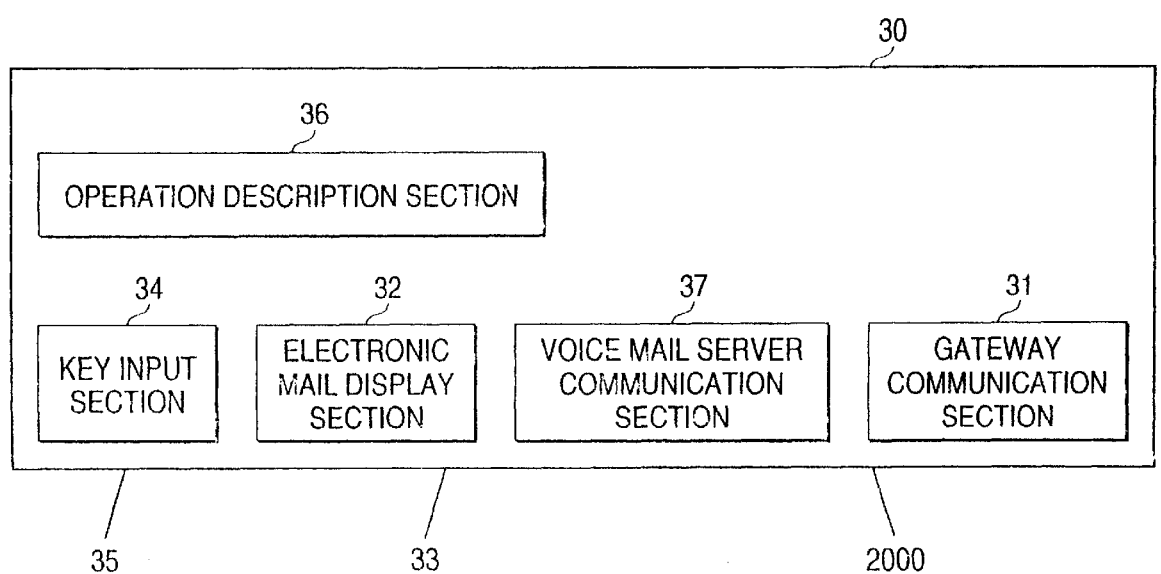
FIG. 3 is a block diagram to show the configuration of the portable telephone in FIG. 1.
Figure 4:
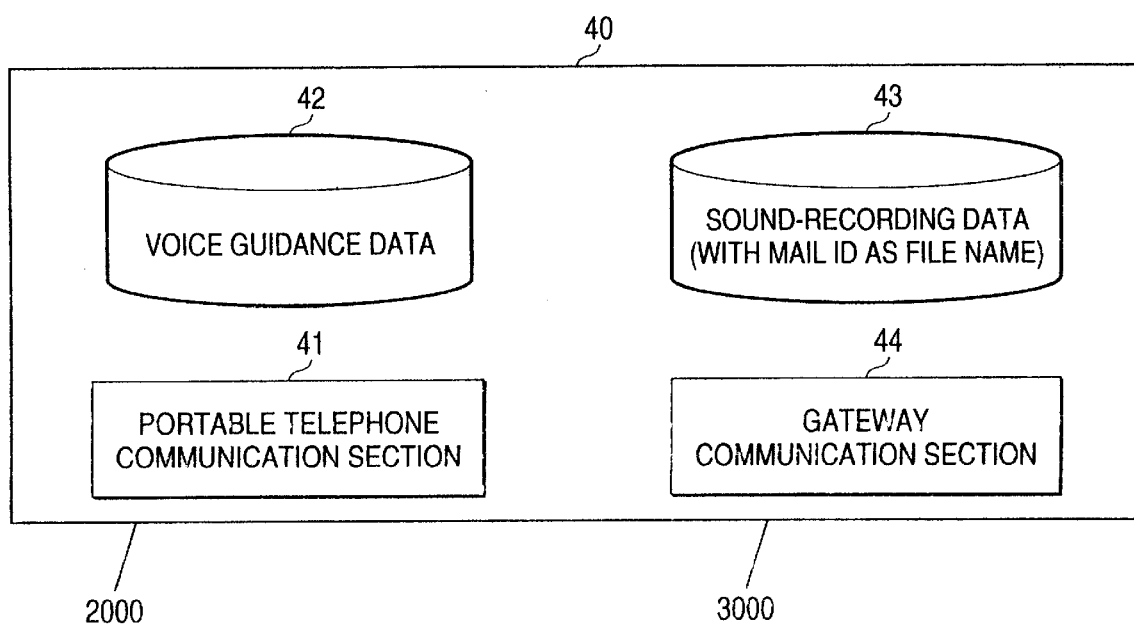
FIG. 4 is a block diagram to show the configuration of the voice mail server in FIG. 1.

First, the configuration of an easy response system comprising a gateway unit, a portable telephone, and a voice mail server in a first embodiment of the invention will be discussed with reference to FIGS. 1 to 4. FIG. 1 is a block diagram to show the configuration of the easy response system comprising a gateway unit, a portable telephone, and a voice mail server in the first embodiment of the invention. FIG. 2 is a block diagram to show the configuration of the gateway unit in FIG. 1. FIG. 3 is a block diagram to show the configuration of the portable telephone in FIG. 1. FIG. 4 is a block diagram to show the configuration of the voice mail server in FIG. 1.

The easy response system shown in FIG. 1 is made up of Internet 1000, a portable telephone network 2000, a wire line 3000, a gateway unit 20 of the Internet 1000 and the portable telephone network 2000, a portable telephone 30 comprising a data communication function, and a voice mail server 40. A personal computer 10 and the gateway unit 20 are connected to the Internet 1000. The gateway unit 20 is connected to the portable telephone network 2000 and a public base station 200 is connected to the portable telephone network 2000. The portable telephone 30 exists in the zone of the public base station 200. The voice mail server 40 is connected to the portable telephone network 2000 over a digital line of ISDN (integrated services digital network), etc., and is connected to the gateway unit 20 over the wire line 3000.

In fact, personal computers other than the personal computer 10 shown in the figure and gateway units other than the gateway unit 20 shown in the figure are connected to the Internet 1000, public base stations other than the public base station 200 shown in the figure and voice mail servers other than the voice mail server 40 shown in the figure are connected to the portable telephone network 2000, and portable telephones other than the portable telephone 30 shown in the figure exist out of doors. However, for easy understanding, they are not shown and are ignored in the description to follow unless otherwise required. In the description that follows, the portable telephone 30 is assumed to be a PHS (personal handy phone system) telephone, but may be a third-generation terminal, a PDC terminal, or a CDMA (code-division multiple access) terminal.

FIG. 2 is a detailed block diagram to show the configuration of the gateway unit 20 shown in FIG. 1. The gateway unit 20 comprises an Internet communication section 21, an electronic mail management section 22, an address management section 23, a portable telephone filter section 24, a portable telephone data communication section 25, a voice mail server communication section 26, and a reply mail preparation section 27.

FIG. 3 is a detailed block diagram to show the configuration of the portable telephone 30 shown in FIG. 1. The portable telephone 30 comprises a gateway communication section 31, an electronic mail display section 32, a display 33, a key input section 34, a keypad 35, an operation description section 36, and a voice mail server communication section 37.

FIG. 4 is a detailed block diagram to show the configuration of the voice mail server 40 shown in FIG. 1. The voice mail server 40 comprises a portable telephone communication section 41, voice guidance data 42, sound-recording data 43 (using a mail ID as a file name), and a gateway communication section 44.

In the gateway unit 20, the Internet communication section 21 transmits and receives electronic mail to and from the personal computer 10 in the Internet 1000 and sends received electronic mail to the electronic mail management section 22. The electronic mail management section 22 manages electronic mail according to mail ID, inquires of the address management section 23 the destination address of the electronic mail, gets the portable telephone number, and sends the portable telephone number of the mail destination, the mail ID, and mail text to the portable telephone filter section 24. The address management section 23 manages the correspondence between electronic mail addresses and portable telephone numbers and responds to an inquiry from the electronic mail management section 22. The portable telephone filter section 24 converts the mail text received from the electronic mail management section 22 into text in a format that can be displayed with a browser installed in the portable telephone 30 and enables an easy reply to be made through the keypad or by voice.

The portable telephone data communication section 25 receives the mail ID, the portable telephone number, and the filter output result from the portable telephone filter section 24 and transmits the mail ID and the filter output result as data to the portable telephone 30 through the portable telephone network 2000. If an easy reply of yes/no is selected by key input on the portable telephone 30, the portable telephone data communication section 25 receives a reply mail preparation operation instruction and the corresponding mail ID from the operation description section 36 in the portable telephone 30. The voice mail server communication section 26 receives reply mail ID and an attached voice file from the voice mail server 40 and sends them to the reply mail preparation section 27.

The reply mail preparation section 27 receives the reply mail preparation operation instruction and the mail ID from the portable telephone data communication section 25, prepares reply mail responsive to the operation instruction, gets the reply destination from the electronic mail management section 22 with the mail ID as a key, and returns the reply mail to the personal computer 10 through the Internet communication section 21, or receives the voice file and the mail ID from the voice mail server communication section 26, prepares reply mail to which the voice file is attached, gets the reply destination from the electronic mail management section 22 with the mail ID as a key, and returns the reply mail to the personal computer 10 through the Internet communication section 21.

In the portable telephone 30, the gateway communication section 31 receives the mail ID and the output data of the portable telephone filter section 24 from the gateway unit 20, passes the output data to the electronic mail display section 32, and transmits operation description for preparing reply mail of yes or no received from the operation description section 36 to the gateway unit 20 together with the mail ID. The electronic mail display section 32 displays the electronic mail data received from the gateway communication section 31 on the display 33 by the browser. The key input section 34 passes input key information received from the keypad 35 to the operation description section 36.

The operation description section 36 inquires of the electronic mail display section 32 the input key information received from the key input section 34 and converts the key input information into operation description of reply mail preparation of yes or no, a voice response to the voice mail server, or the like. For the reply of yes or no, the operation description section 36 sends the operation description to the gateway communication section 31; for the voice response, the operation description section 36 sends the telephone number of the voice mail server 40 to the voice mail server communication section 37 and gives a voice response instruction thereto. The voice mail server communication section 37 receives the telephone number of the voice mail server 40 and the response instruction from the operation description section 36, gets the mail ID from the gateway communication section 31, and originates a call with the mail ID attached to the voice mail server 40. After the call is established, the voice mail server communication section 37 transmits the voice response to the voice mail server 40.

In the voice mail server 40, the portable telephone communication section 41 receives the incoming call from the portable telephone 30, receives the mail ID contained in a call connection message, etc., returns a response message of the voice guidance data 42 to the portable telephone 30, and temporarily stores the voice message from the portable telephone 30 as sound-recording data 43 with the mail ID as a file name. The gateway communication section 44 connects to the gateway unit 20 over the wire line 3000 and transmits the sound-recording data 43 with the mail ID as the file name to the gateway unit 20.

Figures 8, 9:
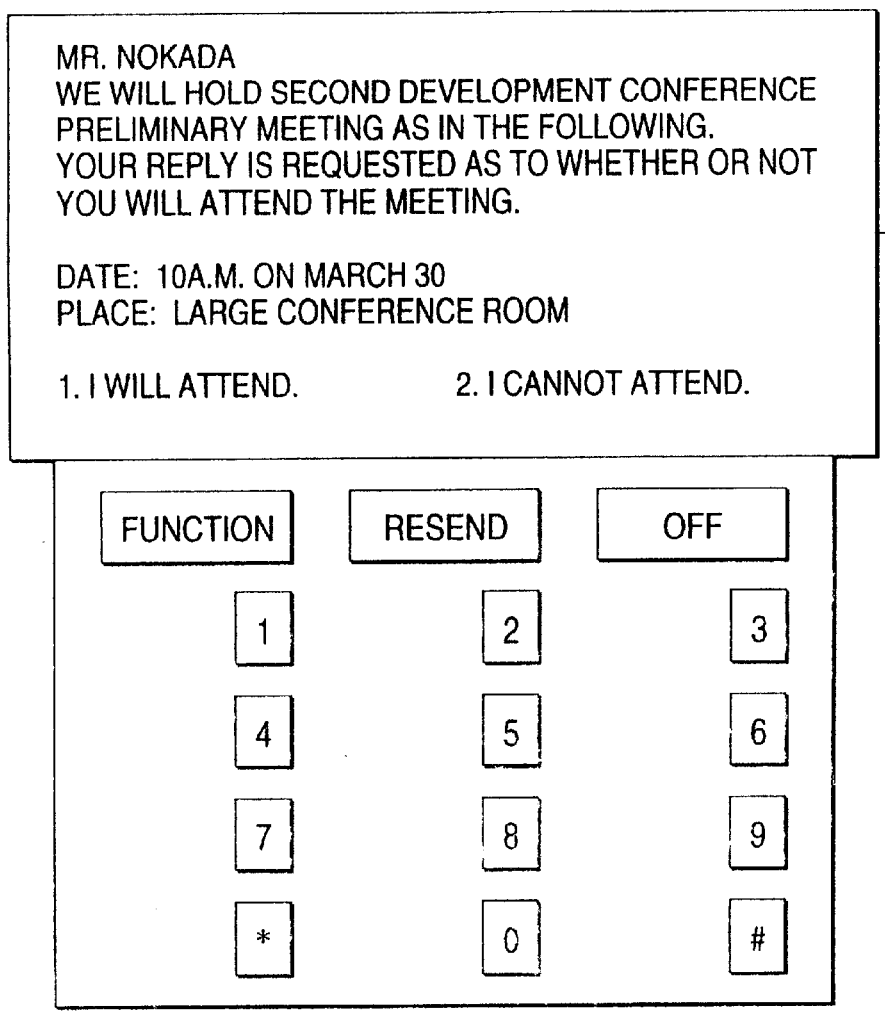
FIG. 8 is a drawing to show an example of using a browser to display the HTML document shown in FIG. 7 on the portable telephone.
FIG. 9 is a drawing to show an example of automatically preparing electronic mail of yes in the gateway unit as instructed from the portable telephone to the electronic mail shown in FIG. 6.

Next, the operation of the easy response system comprising the gateway unit, the portable telephone, and the voice mail server in the first embodiment of the invention will be discussed with reference to FIGS. 5 to 16. FIG. 5 is a schematic representation to describe an easy reply sequence flow for preparing reply mail of no by key input to electronic mail from the personal computer in the Internet to the portable telephone in the first embodiment of the invention. FIG. 6 is a drawing to show a message example of electronic mail sent from the personal computer in the Internet to the portable telephone for requesting the user of the portable telephone to make a reply of yes/no in the first embodiment of the invention. FIG. 7 is a drawing to show a message example as an HTML (Hypertext Markup Language) document into which the electronic mail shown in FIG. 6 to which a reply menu of yes/no is added is converted. FIG. 8 is a drawing to show an example of using the browser to display the HTML document shown in FIG. 7 on the portable telephone. FIG. 9 is a drawing to show an example of automatically preparing electronic mail of yes in the gateway unit as instructed from the portable telephone to the electronic mail shown in FIG. 6. FIG. 10 is a drawing to show an example of using the browser to display a WML document into which the electronic mail shown in FIG. 6 is converted with added answer display indicating presence or absence on the portable telephone.

Figure 11:
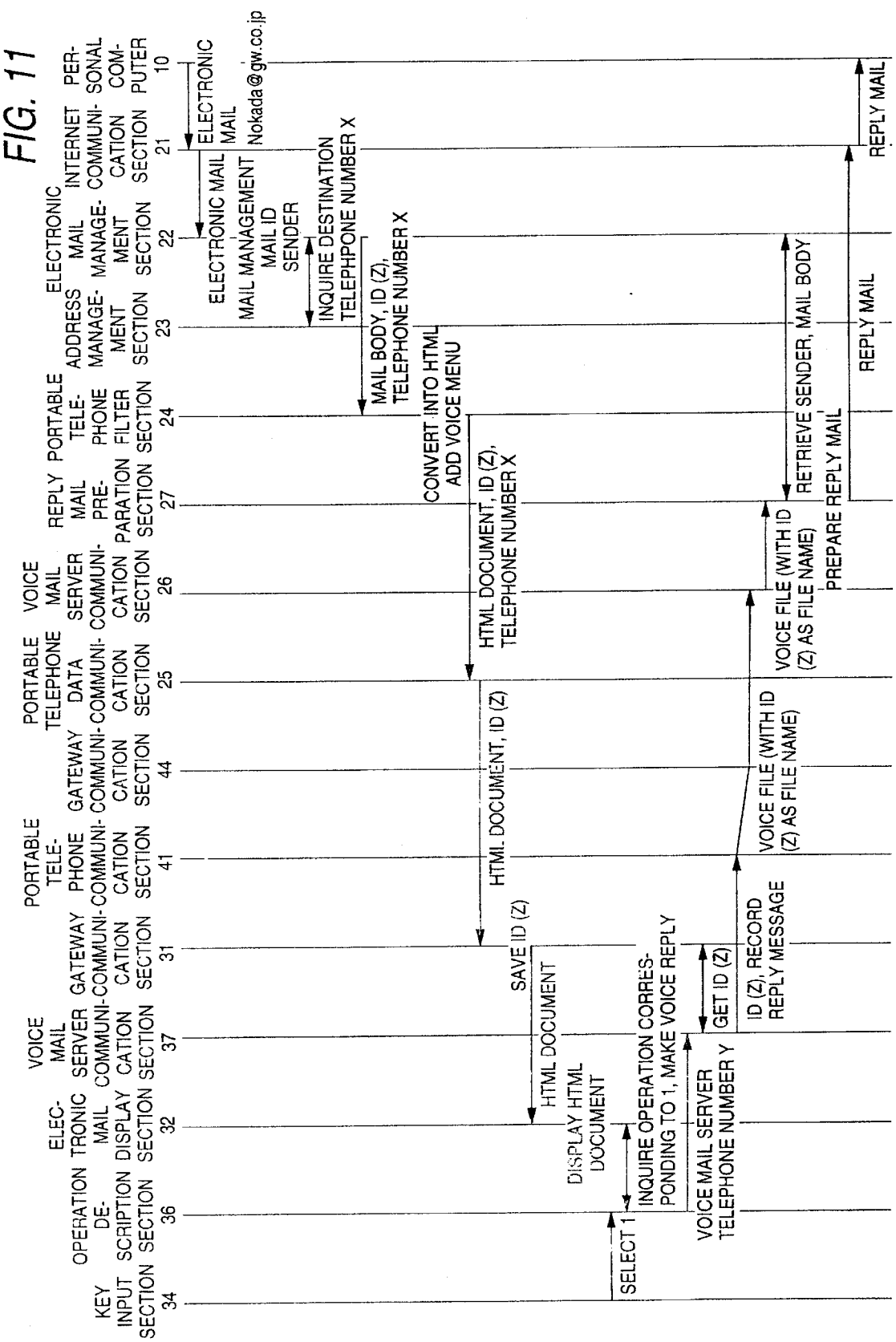
FIG. 11 is a schematic representation to describe an easy reply sequence flow for using the voice mail server to prepare voice reply mail to electronic mail from the personal computer in the Internet to the portable telephone in the first embodiment of the invention.
Figures 12, 13, 14:
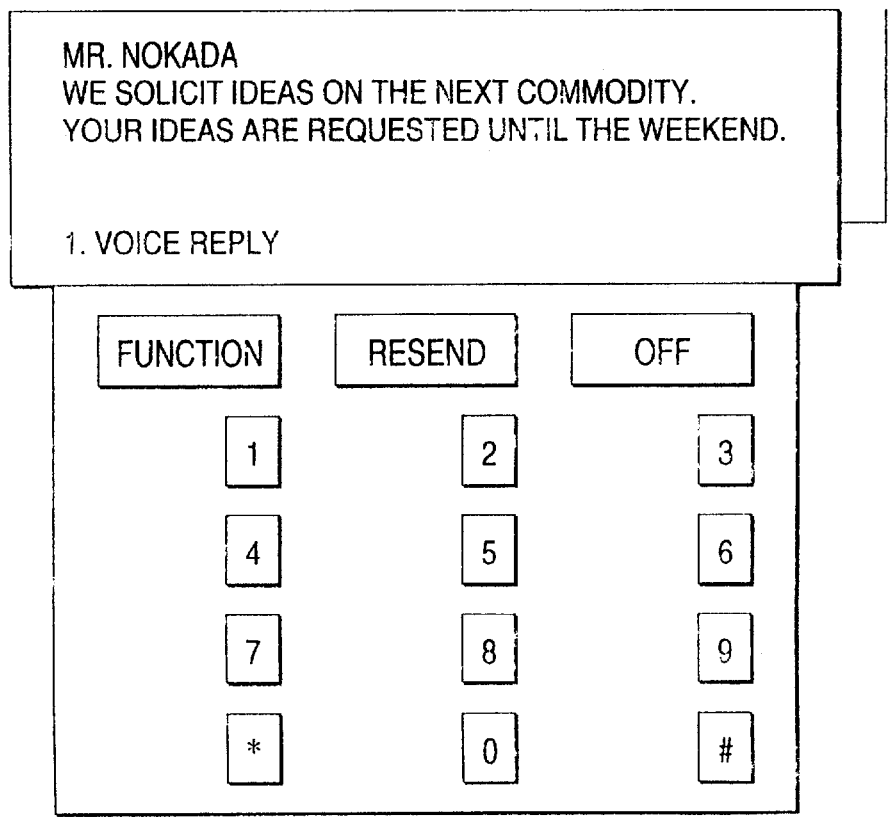
FIG. 12 is a drawing to show a message example of electronic mail sent from the personal computer in the Internet to the portable telephone for requesting the user of the portable telephone to make a voice reply in the first embodiment of the invention.
FIG. 13 is a drawing to show a message example as an HTML document into which the electronic mail shown in FIG. 12 to which a voice reply menu is added is converted.
FIG. 14 is a drawing to show an example of using the browser to display the HTML document shown in FIG. 13 on the portable telephone.

FIG. 11 is a schematic representation to describe an easy reply sequence flow for using the voice mail server to prepare voice reply mail to electronic mail from the personal computer in the Internet to the portable telephone in the first embodiment of the invention. FIG. 12 is a drawing to show a message example of electronic mail sent from the personal computer in the Internet to the portable telephone for requesting the user of the portable telephone to make a voice reply in the first embodiment of the invention. FIG. 13 is a drawing to show a message example as an HTML document into which the electronic mail shown in FIG. 12 to which a voice reply menu is added is converted. FIG. 14 is a drawing to show an example of using the browser to display the HTML document shown in FIG. 13 on the portable telephone. FIG. 15 is a drawing to show an example of automatically preparing reply mail to which a voice file containing a recorded reply message is attached in the gateway unit as instructed from the portable telephone to the electronic mail shown in FIG. 12. FIG. 16 is a drawing to show an example of using the browser to display a WML document into which the electronic mail shown in FIG. 12 is converted on the portable telephone.

In the description to follow, let the electronic mail address of the portable telephone 30 be nokada@gw.co.jp, the electronic mail address of the personal computer 10 be yokada@pc.co.jp, the telephone number of the portable telephone 30 be X, the telephone number of the voice mail server 40 be Y, and the ID of mail sent from the personal computer 10 to the portable telephone 30 be Z.

[To Make an Easy Reply by Preparing a Reply Message of Yes/No]

FIG. 5 is a schematic representation of a communication sequence of personal computer 10-gateway unit 20-portable telephone 30 to describe mail arrival at the portable telephone 30 from the personal computer 10 in the Internet 1000 and a reply instruction from the portable telephone 30. In the description, it is assumed that electronic mail as shown in FIG. 6 is sent from the personal computer 10 in the Internet 1000 to A.

As shown in FIG. 6, the mail body contains information requiring a reply of yes or no. The electronic mail address is represented as user name@domain name. The domain name gw.co.jp indicates the gateway unit 20. The Internet communication section 21 in the gateway unit 20 receives electronic mail indicating the gateway unit 20 as the domain name from the personal computer 10 and passes the electronic mail to the electronic mail management section 22, which then extracts yokada@pc.co.jp of the sender information and z of the mail ID from the header section of the electronic mail and manages them in association with the mail itself. Further, the electronic mail management section 22 inquires of the address management section 23 the telephone number of the user with the user name nokada, gets the telephone number X of the portable telephone 30, and sends Z of the mail ID, the mail body, and the telephone number X to the portable telephone filter section 24.

The portable telephone filter section 24 analyzes the mail body received from the electronic mail management section 22, knows that a reply of yes or no is required, and converts the mail body into the HTML format that can be displayed with an HTML browser of an Internet description language in the portable telephone 30 as shown in FIG. 7. At the time, the description for requesting a reply of yes or not is represented as a numbered menu, as shown in FIG. 7.

The portable telephone data communication section 25 receives the mail ID Z, the portable telephone number X, and the HTML document of the filter output result from the portable telephone filter section 24 and transmits data, namely, the mail ID Z and the HTML document to the portable telephone 30 through the portable telephone network 2000. The gateway communication section 31 in the portable telephone 30 receives the mail ID Z and the HTML document from the gateway unit 20 and passes the HTML document to the electronic mail display section 32. The electronic mail display section 32 having an HTML browser function analyzes the HTML document received from the gateway communication section 31 and displays the HTML document on the display 33 as shown in FIG. 8.

As shown in FIG. 8, reply message selection of yes or no is displayed as a menu. If the user of the portable telephone selects 1 out of the menu, namely, presses 1 on the keypad, the key input section 34 receives 1 and passes it to the operation description section 36, which then inquires of the electronic mail display section 32 what the key 1 received from the key input section 35 means, knows selection of reply mail of yes, and sends reply mail preparation of yes to the gateway communication section 31 as an operation description. The gateway communication section 31 instructs the gateway unit 20 to prepare reply mail of yes to the mail ID Z.

The portable telephone data communication section 25 in the gateway unit 20 sends the instruction for preparing reply mail of yes to the mail ID Z, received from the operation description section 36 to the reply mail preparation section 27 together with the mail ID Z. The reply mail preparation section 27 gets the sender information yokada@pc.co.jp and the mail body from the electronic mail management section 22 based on the received mail ID Z, prepares reply mail as shown in FIG. 9, and transmits the reply mail to the personal computer 10 through the Internet communication section 21 and the Internet 1000.

In the embodiment, the portable telephone filter section 24 and the electronic mail display section 32 have been described by taking HTML as an example, but WML (Wireless Markup Language) of a description language in WAP (Wireless Application Protocol) which is becoming the worldwide standard of portable telephones may be adopted. In this case, screen display of yes/no rather than the selection menu of yes/no appears in the lower part of the display 33 of the portable telephone 30 as shown in FIG. 10, and a predetermined function key of the portable telephone 30 corresponding to yes or no is selected, whereby the reply mail operation (yes or no) is determined.

[To Make an Easy Reply as a Voice Response (Using Voice Mail Server)]

FIG. 11 is a schematic representation of a communication sequence of personal computer 10-gateway unit 20-voice mail server 40-portable telephone 30 to describe mail arrival at the portable telephone 30 from the personal computer 10 in the Internet 1000 and a voice reply instruction from the portable telephone 30 to the voice mail server 40. In the description, it is assumed that electronic mail as shown in FIG. 12 is sent from the personal computer 10 in the Internet 1000 to A.

As shown in FIG. 12, the mail body contains information for accepting a voice reply. The electronic mail address is represented as user name@domain name. The domain name gw.co.jp indicates the gateway unit 20. The Internet communication section 21 in the gateway unit 20 receives electronic mail indicating the gateway unit 20 as the domain name from the personal computer 10 and passes the electronic mail to the electronic mail management section 22, which then extracts yokada@pc.co.jp of the sender information and Z of the mail ID from the header section of the electronic mail and manages them in association with the mail itself. Further, the electronic mail management section 22 inquires of the address management section 23 the telephone number of the user with the user name nokada, gets the telephone number X of the portable telephone 30, and sends Z of the mail ID and the mail body to the portable telephone filter section 24.

The portable telephone filter section 24 analyzes the mail body received from the electronic mail management section 22, knows that a voice reply is accepted, and converts the mail body into the HTML format that can be displayed with the HTML browser of an Internet description language in the portable telephone 30 as shown in FIG. 13. At the time, the description for requesting a voice reply is represented as a numbered menu, as shown in FIG. 13. The portable telephone data communication section 25 receives the mail ID Z, the portable telephone number X, and the HTML document of the filter output result from the portable telephone filter section 24 and transmits data, namely, the mail ID Z and the HTML document to the portable telephone 30 through the portable telephone network 2000. The gateway communication section 31 in the portable telephone 30 receives the mail ID Z and the HTML document from the gateway unit 20 and passes the HTML document to the electronic mail display section 32. The electronic mail display section 32 having the HTML browser function analyzes the HTML document received from the gateway communication section 31 and displays the HTML document on the display 33 as shown in FIG. 14.

As shown in FIG. 14, voice reply message selection is displayed as a menu. If the user of the portable telephone selects 1 out of the menu, namely, presses 1 on the keypad, the key input section 34 receives 1 and passes it to the operation description section 36, which then inquires of the electronic mail display section 32 what the key 1 received from the key input section 35 means, knows selection of a voice reply, sends the telephone number Y of the voice mail server 40 to the voice mail server communication section 37, and gives a voice reply instruction thereto. The voice mail server communication section 37 receives the telephone number Y of the voice mail server 40 from the operation description section 36, gets the mail ID Z from the gateway communication section 31, and calls the voice mail server 40 at the telephone number Y.

The mail ID Z is described for the information elements such as incoming sub in the call setting message. Upon reception of the incoming call from the portable telephone 30, the portable telephone communication section 41 in the voice mail server 40 receives the mail ID Z contained in the call setting message, etc., and returns a response message of the voice guidance data 42 to the portable telephone 30 for prompting the user of the portable telephone 30 to record voice. The user of the portable telephone 30 records a reply message in accordance with the guide of the voice guidance, and the portable telephone communication section 41 temporarily stores the message as sound-recording data 43 with the mail ID as a file name.

The gateway communication section 44 connects to the gateway unit 20 over the wire line 3000 and transmits the sound-recording data 43 with the mail ID Z as the file name to the gateway unit 20. The voice mail communication section 26 in the gateway unit 20 receives the voice file with the mail ID Z as the file name from the voice mail server 40 and sends the voice file to the reply mail preparation section 27, which then gets the sender information yokada@pc.co.jp and the mail body from the electronic mail management section 22 based on the received mail ID Z, prepares reply mail as shown in FIG. 15 to which the voice file is attached, and transmits the reply mail to the personal computer 10 through the Internet communication section 21 and the Internet 1000.

In the embodiment, the portable telephone filter section 24 and the electronic mail display section 32 have been described by taking HTML as an example, but WML (Wireless Markup Language) of a description language in WAP (Wireless Application Protocol) which is becoming the worldwide standard of portable telephones may be adopted. In this case, screen display of voice response rather than the selection menu of voice response appears in the lower part of the display 33 of the portable telephone 30 as shown in FIG. 16, and a predetermined function key of the portable telephone 30 corresponding to voice response is selected, whereby a voice response is made.

In the embodiment, the information element in the call setting message is used to send the mail ID Z from the portable telephone 30 to the voice mail server 40. However, assuming that the voice mail server 40 is connected to PSTN, DTMF may be used to send the mail ID Z. In the embodiment, it is assumed that the telephone number Y of the voice mail server 40 is previously managed in the operation description section 36 in the portable telephone 30. However, if the telephone number Y of the voice mail server 40 is managed in the voice mail server communication section 37 or the gateway unit 20 and it is determined that a voice response is contained in reply means, the telephone number Y of the voice mail server 40 may be sent to the portable telephone 30.

Second Embodiment

Figure 17:
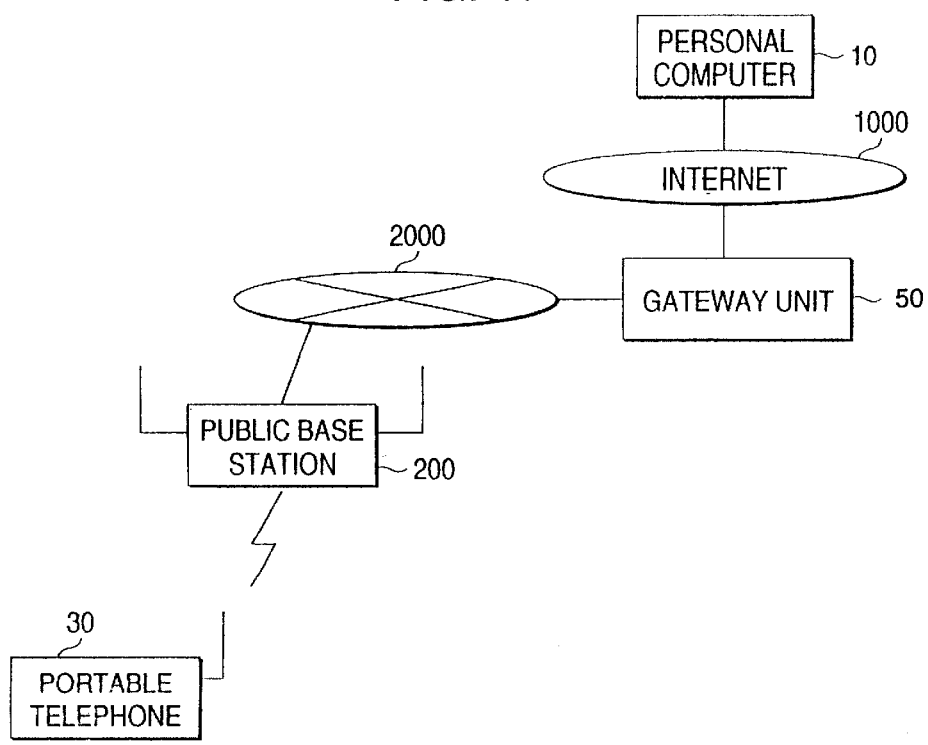
FIG. 17 is a block diagram to show the configuration of an easy response system comprising a gateway unit and a portable telephone in a second embodiment of the invention.
Figure 18:
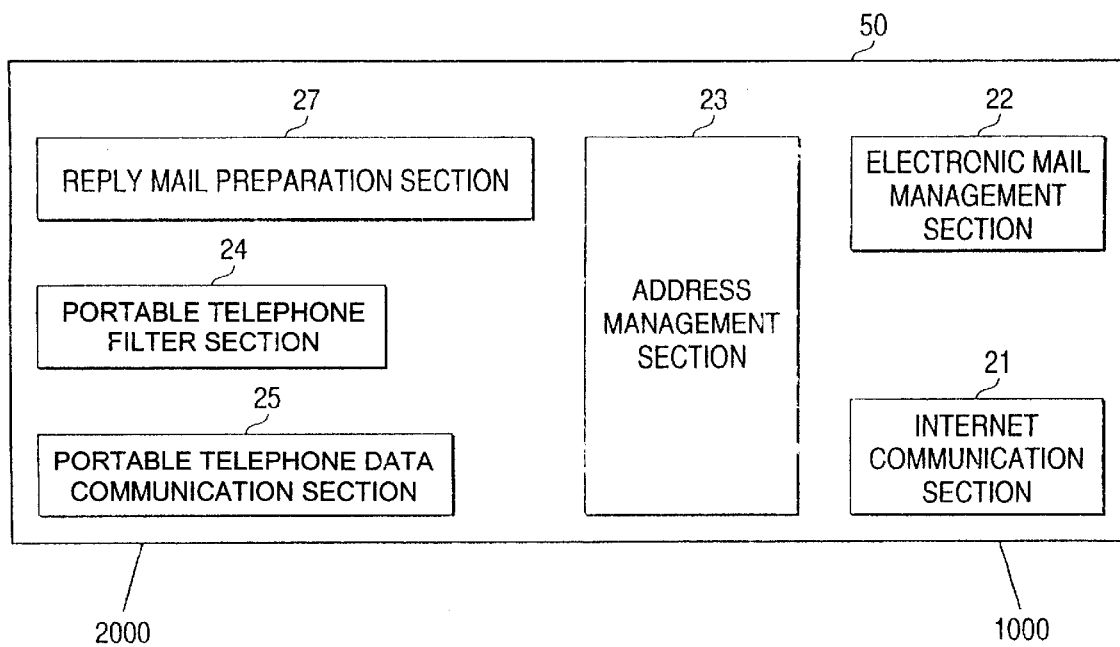
FIG. 18 is a block diagram to show the configuration of the gateway unit in FIG. 17.
Figure 19:
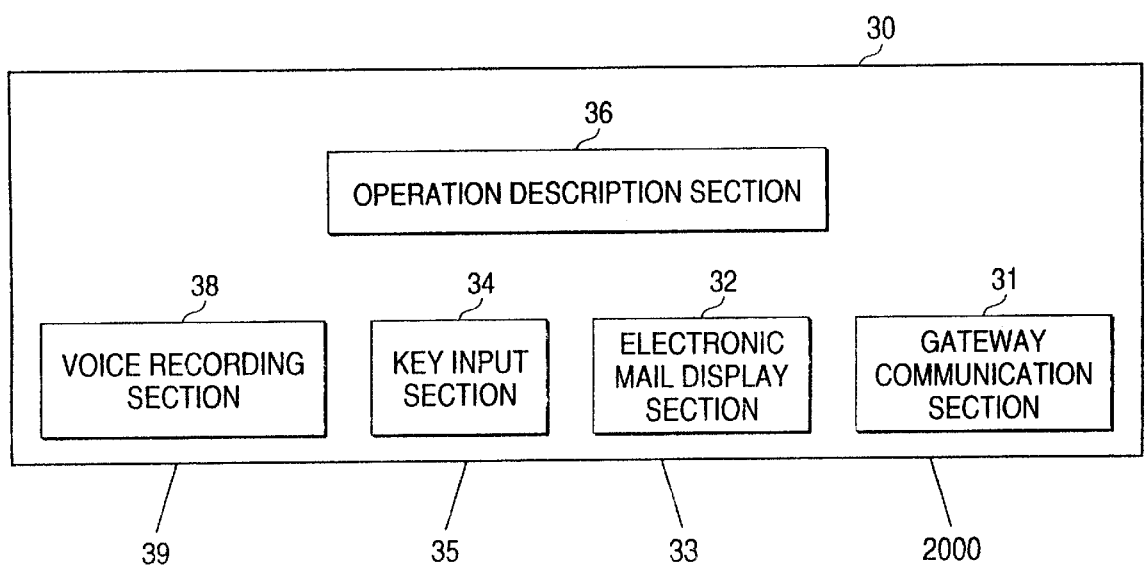
FIG. 19 is a block diagram to show the configuration of the portable telephone in FIG. 17.

Next, the configuration of an easy response system comprising a gateway unit and a portable telephone in a second embodiment of the invention will be discussed with reference to FIGS. 17 to 19. FIG. 17 is a block diagram to show the configuration of the easy response system comprising a gateway unit and a portable telephone in the second embodiment of the invention. FIG. 18 is a block diagram to show the configuration of the gateway unit in FIG. 17. FIG. 19 is a block diagram to show the configuration of the portable telephone in FIG. 17.

FIG. 17 is a system block diagram of the easy response system comprising Internet 1000, a portable telephone network 2000, a gateway unit 50 of the Internet 1000 and the portable telephone network 2000, and a portable telephone 30 comprising a data communication function. A personal computer 10 and the gateway unit 50 are connected to the Internet 1000. The gateway unit 50 is connected to the portable telephone network 2000 and a public base station 200 is connected to the portable telephone network 2000. The portable telephone 30 exists in the zone of the public base station 200. In fact, personal computers other than the personal computer 10 shown in the figure and gateway units other than the gateway unit 50 shown in the figure are connected to the Internet 1000, public base stations other than the public base station 200 shown in the figure are connected to the portable telephone network 2000, and portable telephones other than the portable telephone 30 shown in the figure exist out of doors. However, for easy understanding, they are not shown and are ignored in the description to follow unless otherwise required. In the description that follows, the portable telephone 30 is assumed to be a PHS telephone, but may be a third-generation terminal, a PDC terminal, or a CDMA terminal.

The gateway unit 50 shown in FIG. 18 comprises an Internet communication section 21, an electronic mail management section 22, an address management section 23, a portable telephone filter section 24, a portable telephone data communication section 25, and a reply mail preparation section 27. The portable telephone 30 shown in FIG. 19 contains a gateway communication section 31, an electronic mail display section 32, a display 33, a key input section 34, a keypad 35, an operation description section 36, a voice recording section 38, and a microphone 39. The Internet communication section 21 transmits and receives electronic mail to and from the personal computer 10 in the Internet 1000 and sends received electronic mail to the electronic mail management section 22 in the gateway unit 50.

The electronic mail management section 22 manages electronic mail based on mail ID, inquires of the address management section 23 the destination address of the electronic mail, gets the portable telephone number, and sends the portable telephone number of the mail destination, the mail ID, and mail text to the portable telephone filter section 24. The address management section 23 manages the correspondence between electronic mail addresses and portable telephone numbers and responds to an inquiry from the electronic mail management section 22. The portable telephone filter section 24 converts the mail text received from the electronic mail management section 22 into text in a format that can be displayed with a browser installed in the portable telephone 30 and enables an easy reply to be made through the keypad or by voice.

The portable telephone data communication section 25 receives the mail ID, the portable telephone number, and the filter output result from the portable telephone filter section 24 and transmits the mail ID and the filter output result as data to the portable telephone 30 through the portable telephone network 2000. If an easy reply of yes/no is selected by key input on the portable telephone 30, the portable telephone data communication section 25 receives a reply mail preparation operation instruction and the corresponding mail ID from the operation description section 36 in the portable telephone 30. If a voice response is selected, the portable telephone data communication section 25 receives a voice file in which a reply message is recorded and the corresponding mail ID. The reply mail preparation section 27 receives the reply mail preparation operation instruction and the mail ID from the portable telephone data communication section 25 and prepares reply mail responsive to the operation instruction or receives the voice file in which the reply message is recorded and the mail ID and prepares reply mail to which the voice file is attached, then gets the reply destination from the electronic mail management section 22 with the mail ID as a key and returns the reply mail to the personal computer 10 through the Internet communication section 21.

The gateway communication section 31 receives the mail ID and the output data of the portable telephone filter section 24 from the gateway unit 50, passes the output data to the electronic mail display section 32, and transmits operation description for preparing reply mail of yes or no received from the operation description section 36 or the voice file containing the recorded reply message received from the voice recording section 38 to the gateway unit 50 together with the mail ID. The electronic mail display section 32 displays the electronic mail data that can be displayed with the browser, received from the gateway communication section 31 on the display 33. The key input section 34 passes input key information received from the keypad 35 to the operation description section 36.

The operation description section 36 inquires of the electronic mail display section 32 the input key information received from the key input section 34 and converts the key input information into operation description of reply mail preparation of yes or no, a voice response to the voice mail server, or the like. For the reply of yes or no, the operation description section 36 sends the operation description to the gateway communication section 31; for the voice response, the operation description section 36 instructs the voice recording section 38 to record a reply message. The voice recording section 38 receives the instruction from the operation description section 36, records a reply message of the user of the portable telephone, and passes the voice file containing the recorded reply message to the gateway communication section 31.

Next, the operation of the easy response system comprising the gateway unit and the portable telephone in the second embodiment of the invention will be discussed with reference to FIGS. 12 to 16 and 20. FIG. 20 is a schematic representation to describe an easy reply sequence flow for using a reply message recorded on the portable telephone to prepare voice reply mail to electronic mail from the personal computer in the Internet to the portable telephone in the second embodiment of the invention. The description given with reference to FIGS. 12 to 16 previously in the first embodiment is also applied in the second embodiment and therefore will not be given again.

In the description to follow, let the electronic mail address of the portable telephone 30 be nokada@gw.co.jp, the electronic mail address of the personal computer 10 be yokada@pc.co.jp, the telephone number of the portable telephone 30 be X, and the ID of mail sent from the personal computer 10 to the portable telephone 30 be Z.

[To Make an Easy Reply by Preparing a Reply Message of Yes/No]

This is the same operation as previously described in the first embodiment and therefore will not be discussed again.

[To Make an Easy Reply as a Voice Response (Recording a Reply Message on Portable Telephone)]

Next, a communication sequence of personal computer 10-gateway unit 50-portable telephone 30 for mail arrival at the portable telephone 30 from the personal computer 10 in the Internet 1000 and a voice reply made from the portable telephone 30 will be discussed with reference to FIGS. 12 to 16 and 20.

First, electronic mail as shown in FIG. 12 is sent from the personal computer 10 in the Internet 1000 to A. As shown in FIG. 12, the mail body contains information for accepting a voice reply. The electronic mail address is represented as user name@domain name. The domain name gw.co.jp indicates the gateway unit 50. The Internet communication section 21 in the gateway unit 50 receives electronic mail indicating the gateway unit 50 as the domain name from the personal computer 10 and passes the electronic mail to the electronic mail management section 22, which then extracts yokada@pc.co.jp of the sender information and Z of the mail ID from the header section of the electronic mail and manages them in association with the mail itself. Further, the electronic mail management section 22 inquires of the address management section 23 the telephone number of the user with the user name nokada, gets the telephone number X of the portable telephone 30, and sends Z of the mail ID and the mail body to the portable telephone filter section 24.

The portable telephone filter section 24 analyzes the mail body received from the electronic mail management section 22, knows that a voice reply is accepted, and converts the mail body into the HTML format that can be displayed with the HTML browser of an Internet description language in the portable telephone 30 as shown in FIG. 13. At the time, the description for requesting a voice reply is represented as a numbered menu, as shown in FIG. 13. The portable telephone data communication section 25 receives the mail ID Z, the portable telephone number X, and the HTML document of the filter output result from the portable telephone filter section 24 and transmits data, namely, the mail ID Z and the HTML document to the portable telephone 30 through the portable telephone network 2000.

The gateway communication section 31 in the portable telephone 30 receives the mail ID Z and the HTML document from the gateway unit 50 and passes the HTML document to the electronic mail display section 32. The electronic mail display section 32 having the HTML browser function analyzes the HTML document received from the gateway communication section 31 and displays the HTML document on the display 33 as shown in FIG. 14. As shown in the figure, voice reply message selection is displayed as a menu. If the user of the portable telephone selects 1 out of the menu, namely, presses 1 on the keypad, the key input section 34 receives 1 and passes it to the operation description section 36, which then inquires of the electronic mail display section 32 what the key 1 received from the key input section 35 means, knows selection of a voice reply, and instructs the voice recording section 38 to record a reply message of the user of the portable telephone. The voice recording section 38 passes the reply message recorded through the microphone 39 to the gateway communication section 31 as a voice file.

The gateway communication section 31 transmits a voice response instruction, the voice file in which the reply message is recorded,and the mail ID Z to the gateway unit 50. The portable telephone data communication section 25 in the gateway unit 50 receives the voice response instruction, the voice file, and the mail ID Z from the portable telephone 30 and passes them to the reply mail preparation section 27, which then gets the sender information yokada@pc.co.jp and the mail body from the electronic mail management section 22 based on the received mail ID Z, prepares reply mail as shown in FIG. 15 to which the voice file is attached, and transmits the reply mail to the personal computer 10 through the Internet communication section 21 and the Internet 1000.

In the second embodiment, the portable telephone filter section 24 and the electronic mail display section 32 have been described by taking HTML as an example, but WML (Wireless Markup Language) of a description language in WAP (Wireless Application Protocol) which is becoming the worldwide standard of portable telephones may be adopted. In this case, screen display of voice response rather than the selection menu of voice response appears in the lower part of the display 33 of the portable telephone 30 as shown in FIG. 16, and a predetermined function key of the portable telephone 30 corresponding to voice response is selected, whereby a voice response is made.

In the described message response system of the invention containing the Internet and the portable telephone network, it is made possible to display electronic mail to the portable telephone by the browser installed in the portable telephone and to automatically prepare reply mail indicating yes or no through key input and make a voice response, and an easy response to electronic mail to the portable telephone can be realized. Thus, the system of the invention is particularly useful for data use of the portable telephone.

What is claimed is:

1. An easy message response system comprising:

a gateway unit having a connection interface to the Internet and an interface to a portable telephone network for sending an electronic mail from the Internet to a portable telephone in the portable telephone network and returning a reply from said portable telephone to a party transmitting the electronic mail, said gateway unit comprising:

Internet communication means for transmitting and receiving electronic mail to and from a personal computer in the Internet;

portable telephone filter means for converting the electronic mail addressed to said portable telephone, received from said Internet communication means, into a format for enabling the electronic mail to be displayed on said portable telephone and a reply operation to the electronic mail to be displayed and performed on said portable telephone;

reply mail preparation means for preparing an electronic reply mail to the personal computer in the Internet in response to a reply operation instruction made through key input on said portable telephone; and portable telephone data communications means for transmitting an output result of said portable telephone filter means to said portable telephone and receiving the reply operation instruction given through key input on said portable telephone, and said portable telephone comprising:

gateway communications means for receiving the output result from said portable telephone filter means in said gateway unit and informing said gateway unit of the reply operation instruction corresponding to the key input on said portable telephone;

portable telephone mail display means for displaying the output result received from said portable telephone filter means on a screen of said portable telephone;

key input means for accepting the key input on said portable telephone; and operation description means for converting the key input through said key input means into the reply operation instruction corresponding to the output result displayed by said portable telephone mail display means.

2. An easy message response system comprising:

a gateway unit having a connection interface to the Internet and an interface to a portable telephone network for sending electronic mail from the Internet to a portable telephone in the portable telephone network and returning a reply from said portable telephone to a party transmitting the electronic mail, said gateway unit comprising:

Internet communication means for transmitting and receiving electronic mail to and from a personal computer in the Internet;

portable telephone filter means for adding a reply menu for enabling an easy reply of yes or no to be made on said portable telephone to the electronic mail addressed to said portable telephone, received from said Internet communication means;

reply mail preparation means for preparing reply mail to the personal computer in the Internet in response to a reply menu selection result from said portable telephone; and portable telephone data communication means for transmitting the electronic mail to which the reply menu is added to said portable telephone and receiving reply menu selection result from said portable telephone, and said portable telephone comprising:

gateway communication means for receiving the output data containing the reply menu from said portable telephone filter means in said gateway unit and informing said gateway unit of the operation corresponding to the reply selection menu;

portable telephone mail display means for displaying the output data received from said portable telephone filter means on a screen of said portable telephone;

key input means for accepting the key input on said portable telephone; and operation description means for converting the key input through said key input means into operation description corresponding to information displayed by said portable telephone mail display means.

3. An easy message response system comprising:

a gateway unit having a connection interface to the Internet and an interface to a portable telephone network for sending electronic mail from the Internet to a portable telephone in the portable telephone network and returning a reply from said portable telephone to a party transmitting the electronic mail, said gateway unit comprising:

Internet communication means for transmitting and receiving electronic mail to and from a personal computer in the Internet;

portable telephone filter means for converting the electronic mail addressed to said portable telephone, received from said Internet communication means into a data format in which a yes/no screen for enabling an easy reply to be made on said portable telephone to the electronic mail can be displayed together with corresponding function keys;

reply mail preparation means for preparing reply mail to the personal computer in the Internet in response to a function key selection result from said portable telephone; and portable telephone data communication means for transmitting the electronic mail with the yes/no screen displayed at the position of the function keys and receiving function key selection result from said portable telephone, and said portable telephone comprising:

gateway communication means for receiving the output data containing the yes/no screen display at the position of the function keys from said portable telephone filter means in said gateway unit and informing said gateway unit of the operation corresponding to the function key selection result;

portable telephone mail display means for displaying the output data received from said portable telephone filter means on a screen of said portable telephone;

key input means for accepting the key input on said portable telephone; and operation description means for converting the key input through said key input means into operation description corresponding to information displayed by said portable telephone mail display means.

4. An easy message response system comprising:
a gateway unit having a connection interface to the Internet, an interface to a portable telephone network, and an interface to a voice mail server for transmitting an electronic mail from the Internet to a portable telephone in the portable telephone network and recording a voice reply message in said voice mail server from said portable telephone, wherein said gateway unit receives a voice file containing the recorded voice reply message from said voice mail server and returns a reply mail to which the voice file is attached to a party transmitting the electronic mail, said gateway unit comprising:
  Internet communication means for transmitting and receiving electronic mail to and from a personal computer in the Internet;
  portable telephone filter means for converting the electronic mail addressed to said portable telephone, received from said Internet communication means, into a format for enabling the electronic mail to be displayed on said portable telephone and a voice reply operation to be displayed and performed on said portable telephone for said voice mail server;
  voice mail server communication means for receiving the voice file containing the recorded voice reply message from said portable telephone and corresponding electronic mail information;
  reply mail preparation means for preparing an electronic reply mail to which the voice file is attached to the personal computer in the Internet based on the voice file and the corresponding electronic mail information received from said voice mail server communications means; and
  portable telephone data communications means for transmitting an output result of said portable telephone filter means to said portable telephone, and said portable telephone comprising:
  gateway communications means for receiving the output result from said portable telephone filter means in said gateway unit;
  portable telephone mail display means for displaying the output result received from said portable telephone filter means on a screen of said portable telephone;
  key input means for accepting the key input on said portable telephone; and
  voice mail communication means for adding the corresponding electronic mail information, originating a call, and transmitting the reply message as voice to said voice mail server if the key input on said key means is a voice mail response, and said voice mail server comprising;
  portable telephone communication means for accepting the call originated from said portable telephone, transmitting a voice guidance for prompting a user of said portable telephone to record the voice reply message, and temporarily storing the voice reply message from said portable telephone as the voice file with the corresponding electronic mail information added at the call originating time as an index; and
  gateway communication means for transmitting the voice file to said gateway unit together with the corresponding electronic mail information.

5. An easy message response system comprising:
a gateway unit having a connection interface to the Internet and an interface to a portable telephone network for transmitting an electronic mail from the Internet to a portable telephone in the portable telephone network and returning a voice reply message recorded on said portable telephone as an attached file to a party transmitting the electronic mail, said gateway unit comprising:
  Internet communication means for transmitting and receiving electronic mail to and from a personal computer in the Internet;
  portable telephone filter means for converting the electronic mail addressed to said portable telephone, received from said Internet communication means, into a format for enabling the electronic mail to be displayed on said portable telephone and a voice reply operation to the electronic mail to be displayed and performed on said portable telephone;
  reply mail preparation means for preparing an electronic reply mail to which the voice file containing the recorded voice reply message received from said portable telephone is attached; and
  portable telephone data communications means for transmitting an output result of said portable telephone filter means to said portable telephone, and said portable telephone comprising:
  gateway communications means for receiving the output result from said portable telephone filter means in said gateway unit and transmitting the voice file containing the recorded voice reply message to said gateway unit;
  portable telephone mail display means for displaying the output result received from said portable telephone filter means on a screen of said portable telephone;
  key input means for accepting the key input on said portable telephone; and
  voice recording means for inputting and recording the reply message as voice if the key input on said key input means is a voice mail response.

6. An easy message response system comprising:
a gateway unit having a connection interface to the Internet, an interface to a portable telephone network, and an interface to a voice mail server for transmitting an electronic mail from the Internet to a portable telephone in the portable telephone network and recording a voice reply message in said voice mail server from said portable telephone, wherein said gateway unit receives a voice file containing the recorded voice reply message from said voice mail server and returns the voice file as an attached file to a party transmitting the electronic mail, or preparing a reply message in response to the operation from said portable telephone and returning the reply message to the party transmitting the electronic mail, said gateway unit comprising:
  Internet communication means for transmitting and receiving electronic mail to and from a personal computer in the Internet;
  portable telephone filter means for converting the electronic mail addressed to said portable telephone, received from said Internet communication means, into a format for enabling the electronic mail to be displayed on said portable telephone and a reply operation to be displayed and performed on said portable telephone or a format for enabling a voice reply operation to the electronic mail to be displayed and performed on said portable telephone;
  voice mail server communication means for receiving the voice file containing the recorded voice reply message from said portable telephone and corresponding electronic mail information;

reply mail preparation means for preparing an electronic reply mail to which the voice file is attached to the personal computer in the Internet based on the voice file and the corresponding electronic mail information received from said voice mail server communications means or preparing an electronic reply mail to the personal computer in the Internet in response to a reply operation instruction made through key input on said portable telephone; and portable telephone data communications means for transmitting an output result of said portable telephone filter means to said portable telephone, said portable telephone comprising:

gateway communications means for receiving the output result from said portable telephone filter means in said gateway unit and informing said gateway unit of the operation corresponding to the key input on said portable telephone;

portable telephone mail display means for displaying the output result received from said portable telephone filter means on a screen of said portable telephone;

key input means for accepting the key input on said portable telephone;

operation description means for converting the key input through said key input means into the reply operation instruction corresponding to the output result displayed by said portable telephone mail display means; and voice mail communication means for adding the corresponding electronic mail information, originating a call, and transmitting the reply message as voice to said voice mail server if said operation description means indicates a voice mail response, and said voice mail server comprising;

portable telephone communication means for accepting the call originated from said portable telephone, transmitting a voice guidance for prompting a user of said portable telephone to record the voice reply message, and temporarily storing the voice reply message from said portable telephone as the voice file with the corresponding electronic mail information added at the call originating time as an index; and gateway communication means for transmitting the voice file to said gateway unit together with the corresponding electronic mail information.

7. An easy message response system comprising:

a gateway unit having a connection interface to the Internet and an interface to a portable telephone network for transmitting an electronic mail from the Internet to a portable telephone in the portable telephone network and returning a voice reply message recorded on said portable telephone as an attached file to a party transmitting the electronic mail or preparing a reply message in response to the operation from said portable telephone and returning the reply message to the party transmitting the electronic mail, said gateway unit comprising:

Internet communication means for transmitting and receiving electronic mail to and from a personal computer in the Internet;

portable telephone filter means for converting the electronic mail addressed to said portable telephone, received from said Internet communication means, into a format for enabling the electronic mail to be displayed on said portable telephone and a reply operation to be displayed and performed on said portable telephone or a format for enabling a voice reply operation to the electronic mail to be displayed and performed on said portable telephone;

reply mail preparation means for preparing an electronic reply mail to which the voice file containing the recorded voice reply message received from said portable telephone is attached or preparing an electronic reply mail to the personal computer in the Internet in response to a reply operation instruction made through key input on said portable telephone; and portable telephone data communications means for transmitting an output result of said portable telephone filter means to said portable telephone, and said portable telephone comprising:

gateway communications means for receiving the output result from said portable telephone filter means in said gateway unit and transmitting the voice file containing the recorded voice reply message to said gateway unit or informing said gateway unit of the reply operation instruction corresponding to the key input on said portable telephone;

portable telephone mail display means for displaying the output result received from said portable telephone filter means on a screen of said portable telephone;

key input means for accepting the key input on said portable telephone;

operation description means for converting the key input through said key input means into the corresponding reply operation instruction based on the output result displayed by said portable telephone mail display means; and voice recording means for inputting and recording the reply message as voice if said operation description means indications a voice mail response.

* * * * *

UNITED STATES PATENT AND TRADEMARK OFFICE
CERTIFICATE OF CORRECTION

PATENT NO.   : 6,463,134 B1
DATED        : October 8, 2002
INVENTOR(S)  : Noritake Okada et al.

It is certified that error appears in the above-identified patent and that said Letters Patent is hereby corrected as shown below:

<u>Title page,</u>
Item [56], References Cited, FOREIGN PATENT DOCUMENTS, please delete the following reference: "EP 98/58476 12/1998", and insert therefor the following reference: -- WO 98/58476 12/1998 --
Item [57], ABSTRACT,
Line 14, please delete the following sentences:
"The portable telephone contains gateway communication means for sending key input to the gateway unit, electronic mail display means, and key input means, and operation description means for converting the key input into the corresponding operation. A reply can be easily made to electronic mail through key input or a voice reply can be easily made to electronic mail.".

Signed and Sealed this

First Day of April, 2003

JAMES E. ROGAN
*Director of the United States Patent and Trademark Office*